United States Patent [19]

McDermott

[11] 3,813,858

[45] June 4, 1974

[54] ADJUSTABLE CORN HEAD

[75] Inventor: William C. McDermott, La Porte, Ind.

[73] Assignee: Allis-Chalmers Corporation, Milwaukee, Wis.

[22] Filed: Mar. 5, 1973

[21] Appl. No.: 338,354

[52] U.S. Cl. .................................... 56/119, 56/102
[51] Int. Cl. ............................................ A01d 45/02
[58] Field of Search .......... 56/119, 98, 99, 102, 100

[56] References Cited
UNITED STATES PATENTS

| | | | |
|---|---|---|---|
| 1,912,998 | 6/1933 | Paul et al. | 56/102 |
| 3,213,597 | 10/1965 | Procter | 56/102 X |
| 3,496,708 | 2/1970 | Borhzin | 56/119 |
| 3,528,234 | 9/1970 | Kowalik et al. | 56/119 |

Primary Examiner—Robert Peshock
Assistant Examiner—J. N. Eskovitz
Attorney, Agent, or Firm—Kenneth C. McKivett

[57] ABSTRACT

This disclosure relates to an improvement in corn heads for a forage harvester and provides a first pair of asymmetrical stationary knives coacting with a moving cutter knife for directing and severing stalks and wherein a second pair of knives can be substituted for said first pair of knives to direct stalks to a different portion of said moving cutter knife thereby permitting the forage harvester and/or towing tractor to be shifted laterally to keep one or both from running on a harvested row. A further part of this disclosure relates to a two-row corn head and with the use of a first asymmetrical pair of stationary cutting knives and a dissimilar asymmetrical pair of knives which can be substituted for the first asymmetrical pair in either row, a simple corn head is provided which can be readily adjusted for handling crop rows of various spacings by simply re-arranging the stationary knives.

4 Claims, 7 Drawing Figures

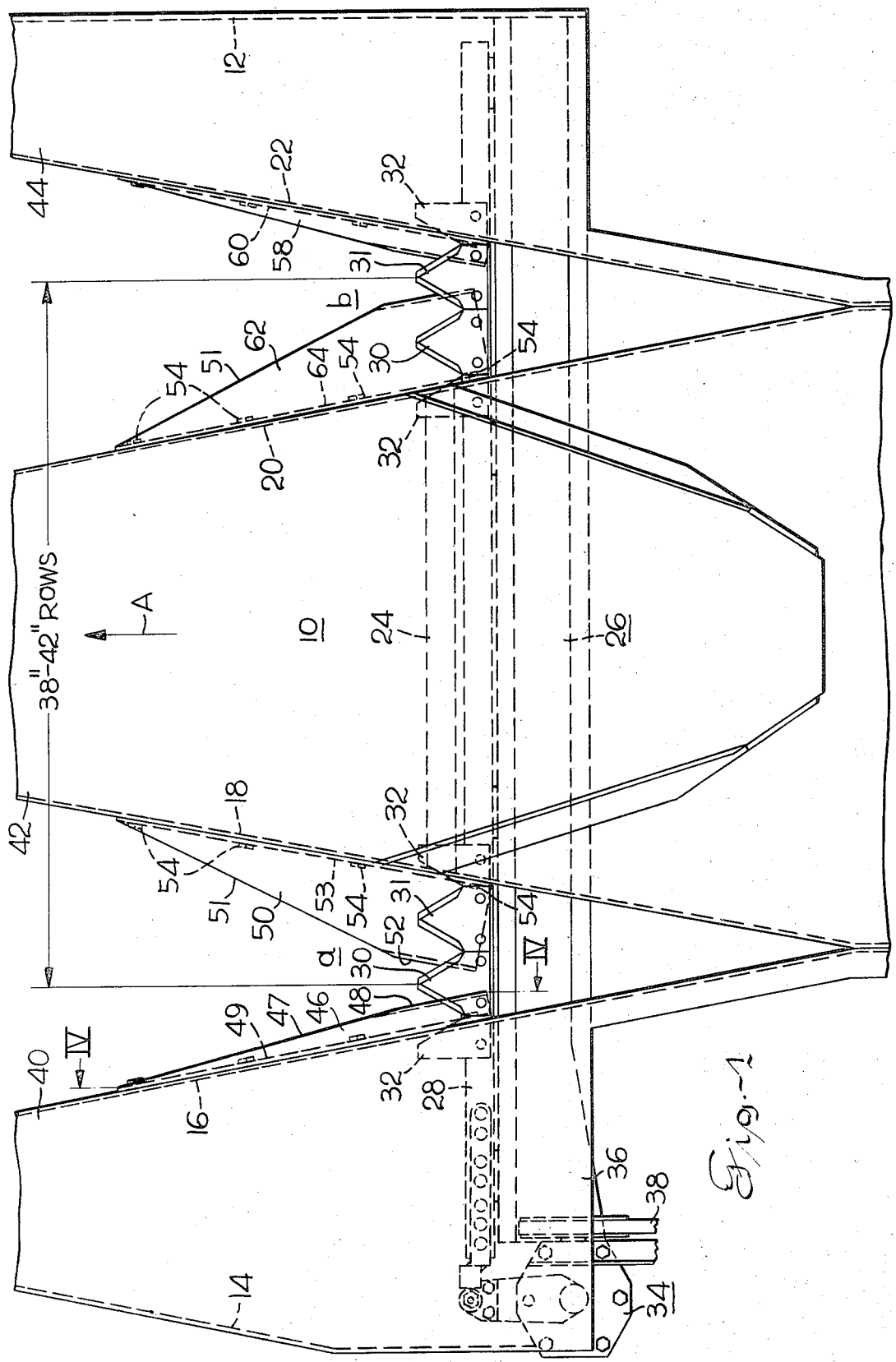

ADJUSTABLE CORN HEAD

This invention is primarily concerned with a two-row corn head for a forage harvester to provide various row spacing capabilities.

The old method of handling the problem of row spacing was to provide a corn head for each specific row spacing which had the inherent disadvantage of providing a need to carry greater inventory to meet anticipated requirements. This was a costly method for manufacturers and dealers to meet the customer's needs.

An object of this invention is to provide a two-row corn head with several simple parts which can be relocated on the head to provide various row spacing cutting abilities.

Formerly, most corn was planted in rows approximately 36 inches apart and farmers consistently planted their rows with this spacing. Of late, much experimentation has taken place in the growing of corn. Check row planting has practically been abandoned and the spacing of corn rows has been tried in various spacings from 28 inches to 48 inches. In fact, some farmers have even planted their corn at closer spacings. At the present time, there is no uniform row spacing for corn. Each farmer uses a spacing which has worked well for him. Accordingly, there is a need for a two-row corn head which can be readily adjusted to handle a variety of corn row spacings.

It is a further object of this invention to provide a two-row corn head with adjustable, simple parts so that the corn head can handle row spacing from 28 inches to 42 inches.

It is a further object of this invention to provide a low cost two-row corn head which can handle many different row spacings.

It is a further object of this invention to provide a two-row corn header for a forage harvester and wherein such header can be used for harvesting corn planted in row spacings from 28 inches to 42 inches and wherein the adjustment of such header from handling 28 inch rows to 34 inch or 42 inch rows consists of adjusting stationary blades mounted for coaction with the sickle bar of such header and wherein such stationary blades are made up of a first pair of blades, one wide and one narrow, with each of such blades being removably mounted on such header by means of four easily removed bolts and an additional set of blades, one wide and one narrow, having connecting flanges on the opposite side of said blades relative to said first pair of blades, and having a second set of said first blades so that the two rows on said header can be provided with one first set of blades on the left row and said additional set of blades on the second row and wherein said second set of said first blades can be substituted for the blades in said right row to handle row crops of a different spacing, or wherein said additional set of blades can be substituted in said left row to handle still another spacing of row crops.

It is a further object of this invention to provide a corn head with a first pair of asymmetrical stationary knives for directing stalks to a particular point for severance between such knives and a moving sickle bar, and the substituting of a second pair of knives for said first pair and which second pair are dissimilar to said first pair so that stalks will be directed and severed at a different point and thereby permitting lateral shifting of the equipment being used.

These together with other objects and advantages which become subsequently apparent reside in the details of construction and operation as more fully hereinafter described and claimed, reference being had to the accompanying drawings forming a part hereof, wherein like numerals refer to like parts throughout, and in which:

FIG. 1 is a plan view of a two row corn header for a forage harvester partially schematic with portions broken away for clarity of illustration;

Figure 3:
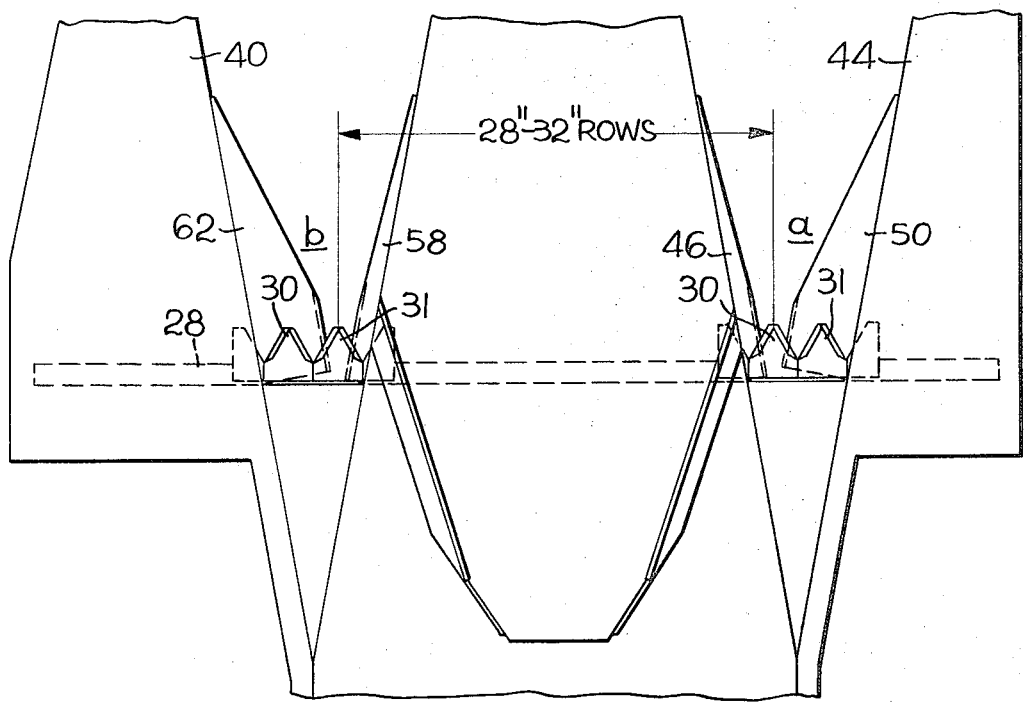
FIG. 3 is a view similar to FIG. 2 showing a further adjustment of the header.

Referring to FIG. 1, a row crop attachment or header 10 of the general type shown in U.S. Pat. No. 3,438,182 issued to K. Q. Kessler, is adapted to be carried by the forward end of a forage harvesting machine or the like (not shown) for movement forwardly over the ground therewith. In the aforementioned Kessler patent, a one-row corn head is shown, whereas, the present invention is concerned primiarily with a two-row corn head. The header 10 has a frame structure including a pair of outer side frame members 12 and 14, and a plurality of fore and aft extending inner frame members 16, 18 20 and 22. The frame members are suitably reinforced by joining the forward ends of members 12 and 22, 18 and 20 and 16 and 14 to form gathering points. Frame members 20 and 18 are further braced by cross-member 24 attached thereto. Rearwardly from cross-member 24, the frame members 12, 14, 16, 18, 20 and 22 are further braced by a sickle drive housing support assembly 26.

A sickle bar 28 is operatively mounted on assembly 26 for reciprocation relative thereto. Sickle bar 28 has two sets of two sickle sections 30 and 31 attached thereto plus two sickle section blanks 32 on each side thereof. These sickle sections 30, 31 and blanks 32 are attached to sickle bar 28 as by riveting. Sickle bar 28 is reciprocally driven by wobble box drive 34 carried by plate 36 positioned between frame members 14 and 16. Wobble box 34 is driven by belt 38 which is driven by a forage harvester (not shown).

Suitable sheet metal is mounted between frame members 14 and 16, 18 and 20, and 22 and 12 to form snouts 40, 42 and 44, respectively, to function as stalk guides.

As shown in FIG. 1, a first set "a" of stationary knives are attached to frame members 16 and 18 in underlying contacting relation to sickle bar sections 30, 31. These stationary knives (set "a") include a narrow knife 46 provided with a guiding portion 47, a cutting portion 48 and vertical flange 49 having openings therein so that such flanges can be bolted to frame member 16. Transversely spaced from knife 46 is a wide knife 50 provided with a guiding portion 51, a cutting portion 52 and a vertical flange 53 having openings therein so that such knife can be bolted to frame member 18 as by four bolts 54.

Figure 4:
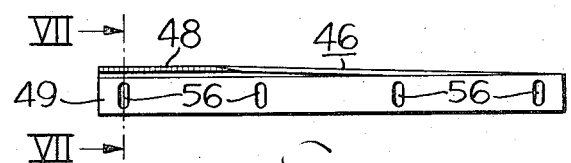
FIG. 4 is a section view taken on line IV—IV of FIG. 1.

As shown in FIG. 4, these openings 56 in vertical flanges 49 and 53 are oblong extending in a vertical direction so that the stationary blades 46 and 50 can be vertically adjusted relative to sickle bar sections 30, 31 to obtain the desired cutting contact therebetween.

As shown in FIG. 1, a second set "b" of stationary knives are attached to frame members 20 and 22 in underlying contacting relation to sickle bar sections 30, 31. This second set of stationary knives include a narrow knife 58 provided with a vertical flange 60 having openings therein so that such flange can be bolted to frame member 22. Transversely spaced from narrow knife 58 is a wide knife 62 provided with a vertical flange 64 having openings therein so that such knife can be bolted to frame member 20 as by four bolts 54.

These openings 56 in vertical flanges 60 and 64 are oblong extending vertically similar to flange 49 shown in FIG. 4 so that stationary blades 58 and 62 can be vertically adjusted relative to sickle bar sections 30, 31 to obtain the desired cutting contact therebetween. In fact, all the stationary knives comprehended by this invention are provided with these oblong openings 56 which are of the same size and relative position so that the blades can be readily adjusted and interchanged to some extent.

The construction shown in FIG. 1 is for the purpose of handling row crops planted 38 inches to 42 inches apart. If the rows are 40 inches apart, the row of stalks will pass midway between the stationary knives as the header 10 moves forwardly in the longitudinal direction indicated by arrow "A." If the rows are 38 inches apart, then the rows of stalks will contact wide knives 50 and 62 which will guide such stalks to a position between opposed stationary knives 46-50 and 58-62, respectively, where such stalks will be severed by coaction between the stationary blades and reciprocating cutter blades 30, 31. If the rows are 42 inches in width, then such row of stalks will contact narrow knives 46 and 58 which will guide such stalks to a position between opposed stationary knives 46-50 and 58-62, respectively, where such stalks will be severed by coaction between stationary knives and reciprocating cutter blades 30, 31.

Figure 2:
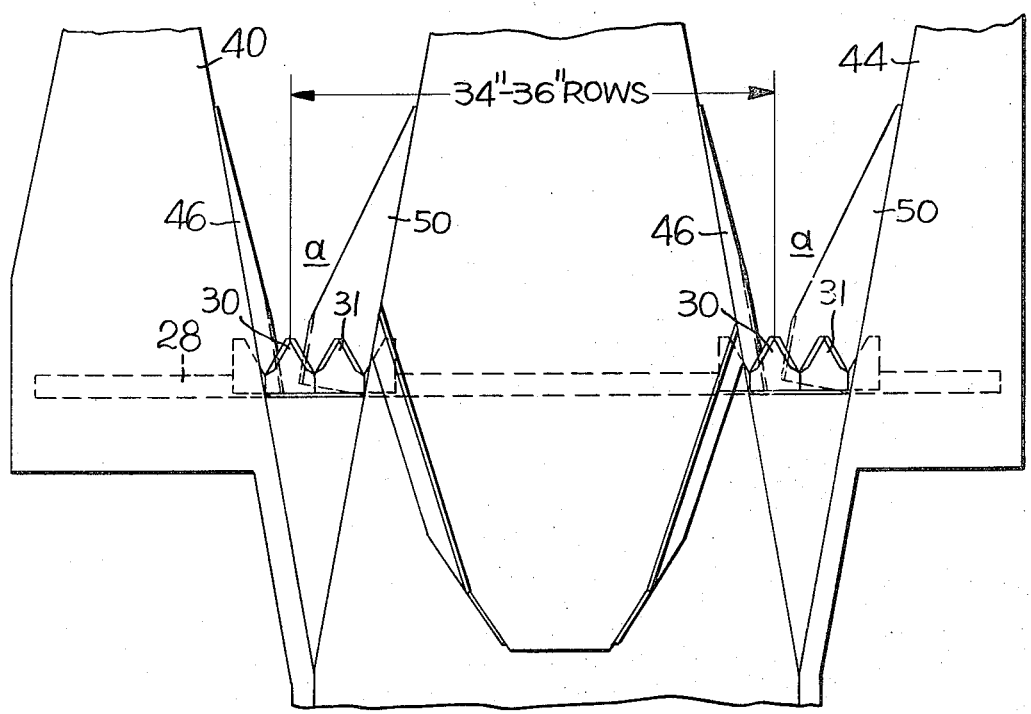
FIG. 2 is a schematic plan view similar to FIG. 1 but of reduced size showing an adjustment of the header.

Now referring to FIG. 2, it is seen that the stationary knives have been arranged so as to handle stalk rows having an intermediate transverse spacing 34 inches to 36 inches. This is accomplished by leaving stationary blade set "a" unchanged in the left-hand row and inserting an additional blade set "a" in the right-hand row in place of blade set "b" of FIG. 1.

Now referring to FIG. 3, it is seen that the stationary knives have been arranged so as to handle stalk rows having a narrow transversal spacing 28 inches to 32 inches. This is accomplished by having a stationary blade set "b" installed in the left-hand row and a stationary blade set "a" installed in the right-hand row. As far as handling in between row spacings, such as 33 inch or 37 inch spaced rows, the 33 inch spacing can be handled by the arrangements shown in FIGS. 2 or 3 and the 37 inch spaced rows can be handled by the arrangement shown in FIGS. 1 or 2.

The conveying mechanism for assisting in moving stalks rearwardly to be severed by cutters 30, 31 and the conveying mechanism for moving the cut stalks rearwardly from such cutters 30, 31 to feed rolls of a forage harvester are not shown as they form no part of this invention and would merely complicate the drawings if included.

Figure 5:
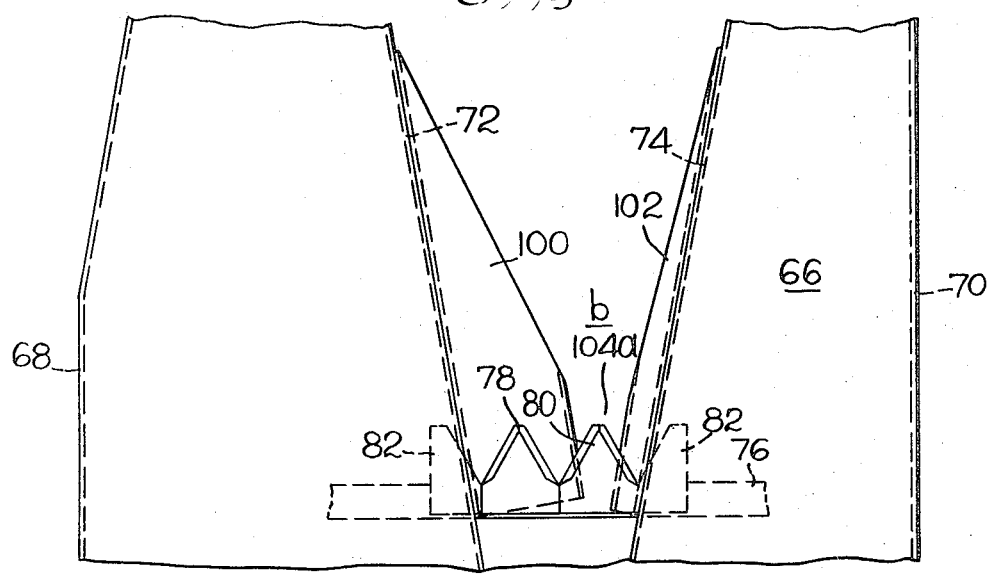
FIG. 5 is a plan view similar to FIG. 1 but showing a one row header.

Now referring to FIG. 5, it is seen that a one-row corn head is presented with most parts removed for clarity of illustration. This one-row corn header 66 has a frame structure including an outer pair of side frame members 68 and 70 and a pair of inner frame members 72 and 74. Frame members 68 and 72 are joined at their forward ends to form gathering points and frame members 70 and 74 are similarly joined. A sickle bar 76 is operatively mounted on frame members 72, 74. Sickle bar 76 has two sickle sections 78 and 80 attached thereto between two blanks 82.

Figure 6:
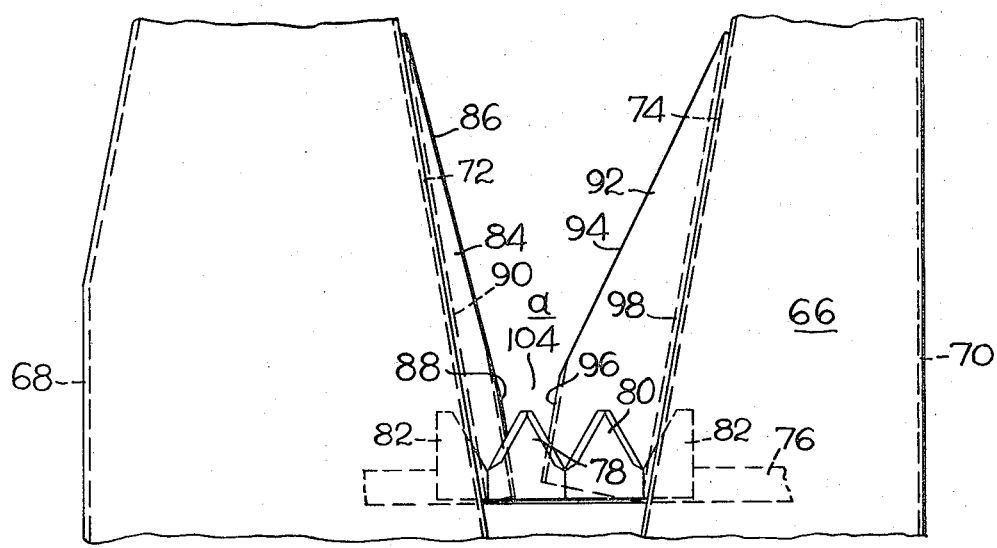
FIG. 6 is a view similar to FIG. 5 showing an adjustment of such header.

As shown in FIG. 6, a first set "a" of stationary knives are attached to frame members 72 and 74 in underlying relation to sickle bar sections 78, 80. These stationary knives (set "a") include a narrow knife 84 provided with a guiding portion 86, a cutting portion 88, a vertical flange 90 having openings 56 therein as shown in FIG. 4 so that such flange can be bolted to frame member 72. Transversely spaced from knife 84 is a wide knife 92 provided with a guiding portion 94, a cutting portion 96 and a vertical flange 98 having openings 56 therein as shown in FIG. 4 so that such knife can be bolted to frame member 74.

As shown in FIG. 5, a second set "b" of stationary knives 100, 102 have been substituted for stationary knives 84, 89, respectively, of FIG. 6. Set "b" includes wide knife 100 and narrow knife 102. From the foregoing, it is readily seen that such substitution of knives has moved the stalk receiving throat 104 of FIG. 6 transversely to the right as it appears 104a in FIG. 5.

From the foregoing, it is seen that the operator of this corn head has the opportunity to adjust the corn head so that the row of crop material enters throat 104 or 104a and thereby provides an adjustment which permits getting the wheels of the forage harvester or the tractor off of a bumpy harvested row.

FIG. 4 shows the vertically extending oblong holes 56 in the vertical flange 49 of stationary blade 46. Because of these vertically extending oblong holes 56 the stationary blade 46 can be adjusted vertically very easily by loosening bolts 54 and vertically moving knife 46 into cutting contact with sickle section 30, 31 and then retightening bolts 54 while this position is maintained. All of the stationary blades 46, 50, 58, 62, 84, 98, 100 and 102 are provided with vertical flanges and vertically extending oblong holes 56 that are similarly spaced apart for interchangeability as has already been described.

Figure 7:
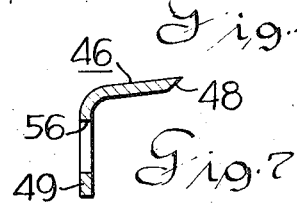
FIG. 7 is a section view taken on line VII—VII of FIG. 4.

FIG. 7 shows a section view of stationary blade 46 having an L-shaped cross-section which includes a first portion 49 extending vertically for fastening to frame 16 (FIG. 1) and a second portion extending from the first portion at an angle slightly greater than 90°. This second portion has a rearward part bevelled to present a cutting edge 48 underlying and contacting sickle section 30 (FIG. 1) for cutting stalks positioned between the stationary blade 46 and sickle section 30.

The embodiments of the invention in which an exclusive property or privilege is claimed are defined as follows:

1. A row crop header for a forage harvester including a frame defining first and second transversely spaced crop receiving throats, a transversely extending sickle bar having two sets of sickle sections each having first and second sections reciprocally carried on said frame with one set being positioned in said first throat and the other set being positioned in said second throat, a first pair of stationary blades mounted on said frame in transversely spaced relation to each other and coacting with one set of sickle sections in said first throat for severing crop material passing between said first pair of stationary blades, said first pair of stationary blades being asymmetrical so that crop material passing therebetween is directed to said first sickle section of said one set, a second pair of stationary blades mounted on said frame in transversely spaced relation to each other and coacting with the other set of sickle sections in said throat for severing crop material passing between said second pair of stationary blades, said second pair of stationary blades being asymmetrical the opposite of said first pair so as to direct material to said second sickle section of said other set, said first and second pairs of stationary blades being spaced to handle row crop of relatively wide row spacing and being interchangeable to handle row crop of relatively narrow row spacing and a third pair of blades identical to said first pair of blades interchangeable with said second pair of blades to handle row crop of intermediate row spacing.

2. A row crop header as recited in claim 1 and wherein each stationary blade is constructed to provide an L-shaped cross-section having a first portion extending vertically for fastening said stationary blade to said frame and a second portion extending from said first portion at an angle slightly greater than 90° with a rear part of said second portion being bevelled to present a cutting edge, said sickle sections being mounted in overlying contacting and coacting relation to said cutting edge for severing crop material positioned between said stationary blades and said sickle sections.

3. A row crop header as recited in claim 1 and wherein each stationary blade is provided with a vertical flange for fastening same to said frame and each flange is provided with a series of vertically oblong holes for receiving fastening members so that each stationary blade can be adjusted vertically to make cutting contact with said sickle bar.

4. A row crop header as recited in claim 1 and wherein each stationary blade is provided with a leading crop guiding portion trailed by a cutting portion coacting with said sickle bar for cutting the crop material.

* * * * *